(12) United States Patent
Meissner et al.

(10) Patent No.: US 11,052,728 B2
(45) Date of Patent: Jul. 6, 2021

(54) AIR INLET APPARATUS AND METHOD FOR OPERATING AN AIR INLET

(71) Applicant: Dr. Ing. h.c. F. Porsche Aktiengesellschaft, Stuttgart (DE)

(72) Inventors: Gantimur Meissner, Berlin (DE); Jochen Leinberger, Stuttgart (DE); Dominic Arnold, Gerlingen (DE); Daniel Zarges, Schwieberdingen (DE); Samuel Gonzalez Moraleja, Herrenberg (DE); Jan Koerner, Leonberg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 115 days.

(21) Appl. No.: 16/247,611

(22) Filed: Jan. 15, 2019

(65) Prior Publication Data
US 2019/0217682 A1   Jul. 18, 2019

(30) Foreign Application Priority Data
Jan. 17, 2018   (DE) .................. 10 2018 100 939.9

(51) Int. Cl.
*B60H 1/00* (2006.01)
*B60H 1/34* (2006.01)

(52) U.S. Cl.
CPC ..... *B60H 1/00871* (2013.01); *B60H 1/00742* (2013.01); *B60H 1/3414* (2013.01);
(Continued)

(58) Field of Classification Search
CPC ............ B60H 1/00871; B60H 1/3414; B60H 2001/3471; B60H 1/3407; B60H 1/00742; B60H 2001/3485
See application file for complete search history.

(56) References Cited

U.S. PATENT DOCUMENTS 4,364,428 A * 12/1982 Ohtsu ................ B60H 1/00985
                                                                165/11.1
5,162,018 A * 11/1992 Horton ................ B60H 1/3407
                                                                251/100
(Continued)

FOREIGN PATENT DOCUMENTS

DE   102009011710 A1   9/2010
DE   102012020539 A1   4/2014
(Continued)

OTHER PUBLICATIONS

Rampf, DE 102015004062 A1 English machine translation, Aug. 27, 2015 (Year: 2015).*
(Continued)

*Primary Examiner* — Kenneth J Hansen
*Assistant Examiner* — Phillip Decker
(74) *Attorney, Agent, or Firm* — Leydig, Voit & Mayer, Ltd.

(57) ABSTRACT

A method for operating an air inlet in a vehicle includes setting, via a touch-sensitive operator control unit in an air stream of the air inlet, a temperature and/or a volume flow of air flowing into an interior of the vehicle through the air inlet. The method also includes controlling a color of one or more luminous elements of the operator control unit depending on the setting of the temperature and/or of the volume flow. An apparatus for an inflow of air includes an air inlet, the air inlet configured to provide an inflow of an air stream into a vehicle interior, and a touch-sensitive operator control unit positioned in front of the air inlet such that the touch-sensitive control unit is disposed in the air stream, the touch-sensitive control unit being configured to set first and second operating parameters of the air inlet.

17 Claims, 1 Drawing Sheet

(52) U.S. Cl.
CPC ............... *B60H 2001/3471* (2013.01); *B60H 2001/3485* (2013.01)

(56) References Cited

U.S. PATENT DOCUMENTS

| | | | | |
|---|---|---|---|---|
| 7,455,581 | B2* | 11/2008 | Gehring | B60H 1/3428 454/155 |
| 9,037,990 | B2* | 5/2015 | Fino | B60H 1/00985 178/18.06 |
| 9,889,721 | B2* | 2/2018 | Wunderlich | B60H 1/00842 |
| 10,272,742 | B2* | 4/2019 | Chavez Hernandez | B60H 1/00985 |
| 10,415,519 | B2* | 9/2019 | Rikitake | F02M 35/10118 |
| 10,434,839 | B2* | 10/2019 | Tille | B60H 1/0065 |
| 10,449,828 | B2* | 10/2019 | Winget, Jr. | B60H 1/00871 |
| 2006/0022521 | A1* | 2/2006 | Szczerba | G06F 3/038 303/191 |
| 2007/0144874 | A1* | 6/2007 | Dorwarth | H03K 17/962 200/5 A |
| 2008/0318510 | A1* | 12/2008 | Shane | B60H 1/3414 454/69 |
| 2010/0327070 | A1* | 12/2010 | Bouchard | B60H 1/00985 236/49.3 |
| 2015/0328958 | A1 | 11/2015 | Winget, Jr. et al. | |
| 2016/0236541 | A1 | 8/2016 | Gruenbeck et al. | |
| 2016/0280039 | A1* | 9/2016 | Vanhelle | B60Q 3/62 |
| 2018/0001734 | A1* | 1/2018 | Faust | B60H 1/00842 |
| 2018/0037087 | A1* | 2/2018 | Cengil | B60H 1/00842 |
| 2019/0193509 | A1* | 6/2019 | Helot | B60H 1/0065 |
| 2020/0148033 | A1* | 5/2020 | Skapof | B60H 1/00657 |

FOREIGN PATENT DOCUMENTS

| | | |
|---|---|---|
| DE | 102013111175 B3 | 9/2014 |
| DE | 102015004062 A1 | 8/2015 |
| DE | 102015009261 A1 | 1/2017 |
| JP | 2009214570 A * | 3/2008 |

OTHER PUBLICATIONS

Graubner, et al, DE 102012020539 A1 English machine translation, Apr. 24, 2014 (Year: 2014).*

* cited by examiner

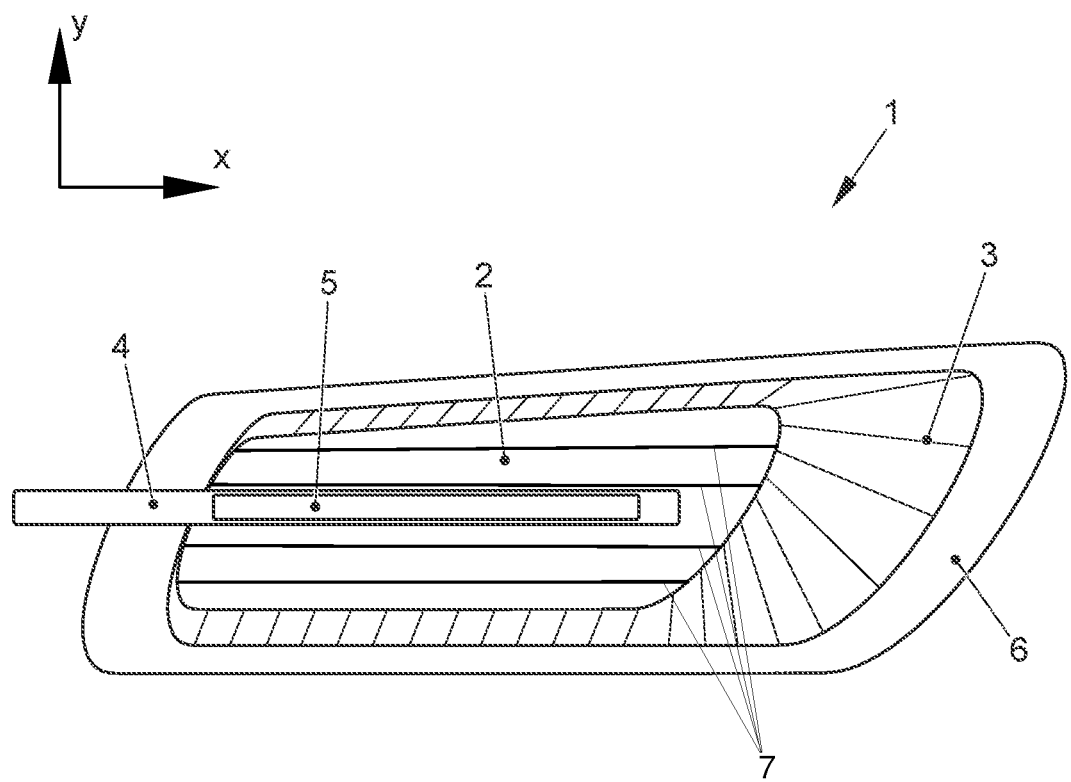

AIR INLET APPARATUS AND METHOD FOR OPERATING AN AIR INLET

CROSS REFERENCE TO RELATED APPLICATIONS

This application claims benefit to German Patent Application No. DE 10 2018 100 939.9, filed Jan. 17, 2018, which is hereby incorporated by reference herein.

FIELD

The present invention relates to a method for operating an air inlet for the inflow of air into the interior of a vehicle, comprising a first method step for setting the temperature and/or the volume flow of the air which has flowed in.

BACKGROUND

Air inlets are known from the prior art. Motor vehicles usually have a plurality of air inlets which are distributed in the vehicle interior. Fresh air flows into the interior of a vehicle through said air inlets. In order to increase the comfort of the vehicle passengers and therefore to maintain their concentration in traffic, but also to remove ice and condensation from the vehicle windshield for example, it is necessary to control the temperature and the volume flow of the air which has flowed in. The settings for the air inlets are usually made on rotary controllers, slide controllers or setting buttons which are fitted in a central location in the vehicle cockpit or in the vicinity of the individual air inlets.

The adjustment of temperature and volume flow using centrally fitted controllers is not intuitive and can likewise distract the driver from the traffic, as can monitoring the settings at the air inlets themselves.

DE 10 2015 009 261 A1 discloses an inlet apparatus comprising a touch-sensitive display for controlling the inlet apparatus, wherein the display is fitted in the vicinity of the inlet apparatus. One disadvantage of this disclosure is that although the operator control unit is fitted in a more intuitive manner, the driver has to look at the operator control unit, which is designed as a display, for operator control purposes.

SUMMARY

In an embodiment, the present invention provides a method for operating an air inlet in a vehicle. The method includes setting, via a touch-sensitive operator control unit in an air stream of the air inlet, a temperature and/or a volume flow of air flowing into an interior of the vehicle through the air inlet, and controlling a color of one or more luminous elements of the operator control unit depending on the setting of the temperature and/or of the volume flow.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

The sole FIGURE schematically illustrates the design of an air inlet according to an embodiment of the invention.

DETAILED DESCRIPTION

Embodiments of the present invention provide methods for operating an air inlet in a vehicle, which air inlet, in comparison to the prior art, can be operated in an intuitive manner and provides the user with feedback pertaining to the selected settings, without excessively distracting said user from the traffic.

Embodiments of the invention provide methods for operating an air inlet in a vehicle, wherein, in a first method step, the temperature and/or the volume flow of the air which has flowed into the vehicle interior through the air inlet are/is set by means of a touch-sensitive operator control unit in the air stream of the air inlet, characterized in that, in a second method step, the color of one or more luminous elements of the operator control unit is controlled depending on the setting selected in the first method step.

As a result, methods for operating an air inlet in a vehicle are provided, which methods are distinguished in comparison to the prior art by highly intuitive operator control and direct feedback relating to the selected setting to the user without distracting said user from the traffic. Positioning the operator control unit in the air stream allows for direct sensitive monitoring of the selected setting by the hand of the user. Combined with the particularly intuitive design of the operator control unit, conceivably as a touch-sensitive bar web, it is therefore possible, for example by swiping across the operator control unit toward the right, to in this way increase the temperature of the air which has flowed out and, when swiping across the operator control unit, to at the same time make a decision as to whether the air which has flowed out is too hot or too cold. In a preferred embodiment of the invention, in addition to swiping across the operator control unit, a second operating parameter is set by moving two fingers away from one another or toward one another on the operator control unit. Controlling the color of one or more luminous elements depending on the selected setting is particularly advantageous. Therefore, it is possible to check the temperature setting, for example out of the corner of one's eyes, without looking away from the road.

According to a preferred embodiment of the invention, the temperature and/or the volume flow of the air which has flowed into the vehicle interior through the air inlet are/is set by shifting the operator control unit in a direction in the xy plane. As a result, in addition to the option of using the touch-sensitivity of the operator control unit, a further option for setting operating parameters is created. It would be conceivable to set the temperature by way of a swiping gesture along the operator control unit and to set the volume flow by shifting the operator control unit. Therefore, two variables can be set with one hand movement in a particularly advantageous manner.

In a further preferred implementation of the present invention, the temperature and/or the volume flow of the air which has flowed into the vehicle interior through the air inlet are/is set by rotating the operator control unit about its longitudinal axis. The option of setting an operating parameter of the air inlet by rotating the operator control unit provides a further advantageous option of setting the climate-controlled arrangement using only one single hand movement.

According to a preferred implementation of the present invention, the setting of the temperature and/or of the volume flow is transmitted to one or more other air inlets.

The transmission of the settings selected at one air inlet to other air inlets is particularly advantageous since, in this way, climate control can be performed in relatively large areas or in the entire vehicle interior by a single hand movement.

Embodiments of the present invention further provide apparatuses for the inflow of air using a method according to an embodiment of the invention or a method according to a preferred implementation of a method according to an embodiment of the invention, wherein the apparatus has an air inlet for the inflow of an air stream into a vehicle interior, wherein the apparatus has an operator control unit for setting the air inlet, and wherein the operator control unit has luminous elements, characterized in that the apparatus is configured in such a way that the temperature and/or the volume flow of the air which has flowed into the vehicle interior through the air inlet can be set by touching a touch-sensitive operator control unit and the color of one or more luminous elements is controlled depending on the selected setting of the temperature and/or of the volume flow. In this way, an air inlet is provided which can be operated in a particularly intuitive manner by swiping across the operator control unit. It is conceivable to position the operator control unit in the air stream. This allows direct feedback in respect of the selected settings of the air inlet. In a preferred implementation of the invention, the operator control unit is designed as a capacitive display, particularly preferably as a multi-touch display. The variable color of the luminous elements of the operator control unit allows for the selected climate-control setting to be displayed in a particularly advantageous manner.

According to a preferred implementation of the invention, the operator control unit is configured in the form of a bar in the xy plane. The configuration in the form of a bar is particularly advantageous since this renders the operator control arrangement as a touch-sensitive slider preferable. Swiping across a slider of this kind is particularly intuitive and therefore is less of a distraction from the traffic.

According to a preferred implementation of the invention, the operator control unit is fitted to a receiving part. Fitting the operator control unit to a receiving part advantageously improves the mechanical properties of the apparatus. For example, vibrations which would have been transmitted to the operator control unit by the vehicle can be damped, or forces which are produced during operator control of the air inlet are absorbed and dissipated.

In a further preferred embodiment, the operator control unit is fitted to air-guiding slats without coupling. Air-guiding slats serve to control the direction of the air stream. To this end, said air-guiding slats are tilted. It is advantageous to not couple the operator control unit to air-guiding slats since the locational stability of the operator control unit is increased and undesired adjustment of the air-guiding slats when operating the air inlet is reduced.

According to a preferred embodiment of the invention, the operator control unit is fitted over the inflow air duct such that it can be shifted in the y direction. The variable y position of the operator control unit advantageously adds a further degree of freedom to the operator control options. In addition to the option of setting an operating variable by means of swiping across the operator control unit, a further operating variable can be set by the user by way of a change in position of the operator control unit along they axis.

According to a further preferred embodiment of the invention, the side faces of the inflow air duct have a grooved structure. The direction of flow of the air which has flowed out can be set by skilled shaping of the grooved structure of the inflow air duct.

In a further preferred embodiment of the invention, the operator control unit is designed to be rotatable about the longitudinal axis which lies in the xy plane. This embodiment advantageously allows a further degree of freedom to be provided when operating the apparatus. Therefore, in addition to swiping across the touch-sensitive operator control unit, a further operating variable could be influenced by the user by way of rotating the operator control unit.

According to an advantageous embodiment of the invention, the operator control unit is configured in such a way that the surface temperature of the operator control unit can be set along its longitudinal axis. The temperature-sensitivity of human skin allows an operating parameter of the apparatus to be directly presented in the event of operator control by swiping across the operator control unit. In this way, the user can be provided with information about, for example, the settable temperature in a particularly advantageous manner.

In a further preferred embodiment of the present invention, the apparatus is surrounded by an apparatus receptacle of three-dimensional configuration. The apparatus receptacle could comprise, for example, 3D-shaped glass, aluminum, carbon or wood. Receiving the air inlet in an apparatus receptacle allows the component to be integrated into an existing vehicle interior in an advantageous manner. Hereby, parts of the apparatus, such as the operator control unit or the receiving part for example, can be modified, so that there are no protrusions or edges which could cause a distraction during operation of the vehicle or present a hazard in the event of an accident.

The FIGURE schematically illustrates an air inlet according to an embodiment of the invention. The air inlet 1 comprises an inflow air duct 2, the walls 3 of which have a grooved structure. Air, which has flowed into the interior of a vehicle from the air inlet 1 through the inflow air duct 2, can be monitored in respect of its direction of flow by corresponding shaping of the grooved structure on the walls 3 of the inflow air duct 2. A bar-like operator control unit 5 is located on a receiving part 4 which is fitted over the inflow air duct 2 centrally in the y direction. The receiving part 4 can be shifted in the y direction together with the operator control unit 5. The receiving part 4 is mounted in the shifting mechanism such that its movement is damped and the user is provided with haptic feedback when it is moved. An operating parameter of the air inlet 1 can be changed by virtue of the shifting operation. The receiving part 4 is further mounted, together with the operator control unit 5, such that it can rotate about its longitudinal axis. Furthermore, in this exemplary embodiment, the receiving part 4 is fitted, together with the operator control unit 5, such that rotation through 90° in the clockwise direction about the longitudinal axis and that rotation through 90° in the counterclockwise direction about the longitudinal axis are possible. After rotation by the user, the receiving part 4, together with the operator control unit 5, returns to the starting position again. An operating parameter of the air inlet can be changed by virtue of the rotation. The operator control unit 5 is designed as a touch-sensitive touch display. An operating parameter of the air inlet 1 corresponding to the y coordinate of the contact operation, that is the difference between they coordinates of the start point and end point of the swiping gesture, can be set by touching the operator control unit 5 at one point or by swiping across the operator control unit 5 parallel to the y axis. Therefore, the hand of the user is in the air stream during the setting process of an operating parameter, and the user is therefore provided with direct feedback about the setting made during the setting process. In addition to haptic feedback, a selected operating parameter is visually displayed by way of the color of the operator control unit 5. For the operating parameter temperature, the color of the operator control unit 5 is set in a manner corresponding to the temperature, wherein the color blue corresponds to a low temperature and the color red corresponds to a high temperature. Neither the receiving part 4 nor the operator control unit 5 is coupled to air-guiding slats 7. The air inlet 1 is enclosed by an apparatus receptacle 6. The apparatus receptacle 6 embeds the air inlet 1 such that no parts of the air inlet 1 are situated in the vehicle interior in a disadvantageous manner.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for operating an air inlet in a vehicle, the method comprising:
   setting, via a touch-sensitive bar positioned in an air stream of the air inlet, a temperature and/or a volume flow of air flowing into an interior of the vehicle through the air inlet, and
   controlling, depending on the set temperature and/or volume flow, a color of one or more luminous elements of the touch-sensitive bar,
   wherein the touch-sensitive bar has a longitudinal axis,
   wherein the setting the temperature and/or the volume flow is performed by rotating the touch-sensitive bar about its longitudinal axis.

2. The method as claimed in claim 1, wherein the temperature and/or the volume flow of the air flowing into the vehicle interior through the air inlet are/is set by shifting the touch-sensitive bar in a direction in an xy plane, the longitudinal axis of the touch-sensitive bar lying in the xy plane.

3. The method as claimed in claim 1, wherein the set temperature and/or the set volume flow is transmitted to one or more other air inlets.

4. An apparatus for an inflow of air, the apparatus comprising:
   an air inlet configured to provide an inflow of an air stream into a vehicle interior, the air inlet including air-guiding slats configured to control a direction of the air stream,
   a touch-sensitive bar positioned in front of the air inlet such that the touch-sensitive bar is disposed in the air stream, the touch-sensitive bar being configured to set first and second operating parameters of the air inlet, the first and second operating parameters being selected from a temperature of the air stream and a volume flow of the air stream, the touch-sensitive bar having a longitudinal axis, and the touch-sensitive bar including luminous elements,
   wherein the touch-sensitive bar is configured to rotate about its longitudinal axis so as to set the first operating parameter,
   wherein the touch-sensitive bar is configured to receive tactile input for setting the second operating parameter, and
   wherein a color of one or more of the luminous elements of the touch-sensitive bar is determined from the first and/or the second operating parameter.

5. The apparatus as claimed in claim 4, wherein the touch-sensitive bar is not coupled to the air-guiding slats.

6. The apparatus as claimed in claim 5, wherein the air inlet is partially or entirely surrounded by a receptacle of three-dimensional configuration, and
   wherein the longitudinal axis of the touch sensitive bar is disposed in an xy plane, and
   wherein a projection of the receptacle onto the xy plane forms an outer perimeter and an inner perimeter, the inner perimeter enclosing an interior region, the interior region corresponding to an air duct of the air inlet.

7. The apparatus as claimed in claim 6, wherein the touch sensitive bar extends, along its longitudinal axis, from a first point to an end point,
   wherein the first point is disposed, in the xy plane, in a region between the outer perimeter and the inner perimeter, and
   wherein the end point is disposed, in the xy plane, in the interior region.

8. The apparatus as claimed in claim 7, wherein the air guiding slats are disposed in the air duct and are located, in a direction perpendicular to the xy plane, at a distance from the touch sensitive bar.

9. The apparatus as claimed in claim 4, wherein the longitudinal axis of the touch-sensitive bar is disposed in an xy plane, and
   wherein the touch-sensitive bar is configured to be shifted in a y direction in the xy plane in order to set a third operating parameter of the air inlet.

10. The apparatus as claimed in claim 4, wherein side faces of an inflow air duct have a grooved structure.

11. The apparatus as claimed in claim 4, wherein the touch-sensitive bar is configured in such a way that a surface temperature of the touch-sensitive bar can be set along its longitudinal axis.

12. The apparatus as claimed in claim 4, wherein the air inlet is partially or entirely surrounded by an apparatus receptacle of three-dimensional configuration.

13. The apparatus as claimed in claim 4, wherein the touch-sensitive bar is configured to rotate about its longitudinal axis through 90° from a starting position in a clockwise direction and through 90° from the starting position in a counterclockwise direction.

14. The apparatus as claimed in claim 4, wherein the touch-sensitive bar is configured to provide, in response to receiving user input, haptic feedback.

15. The apparatus as claimed in claim 4, wherein the color of the one or more of the luminous elements of the touch-sensitive bar is determined from the set temperature of the air stream.

16. The apparatus as claimed in claim 4, wherein the second operating parameter is the temperature of the air stream, and wherein the color of the one or more of the luminous elements of the touch-sensitive bar is determined from the second operating parameter.

17. The apparatus as claimed in claim 16, wherein the touch-sensitive bar is configured to receive tactile input in the form of a swiping gesture and is configured to set the second operating parameter based on a difference of a coordinate corresponding to a start point the swiping gesture and a coordinate corresponding to an end point of the swiping gesture.

\* \* \* \* \*